Figure 1:
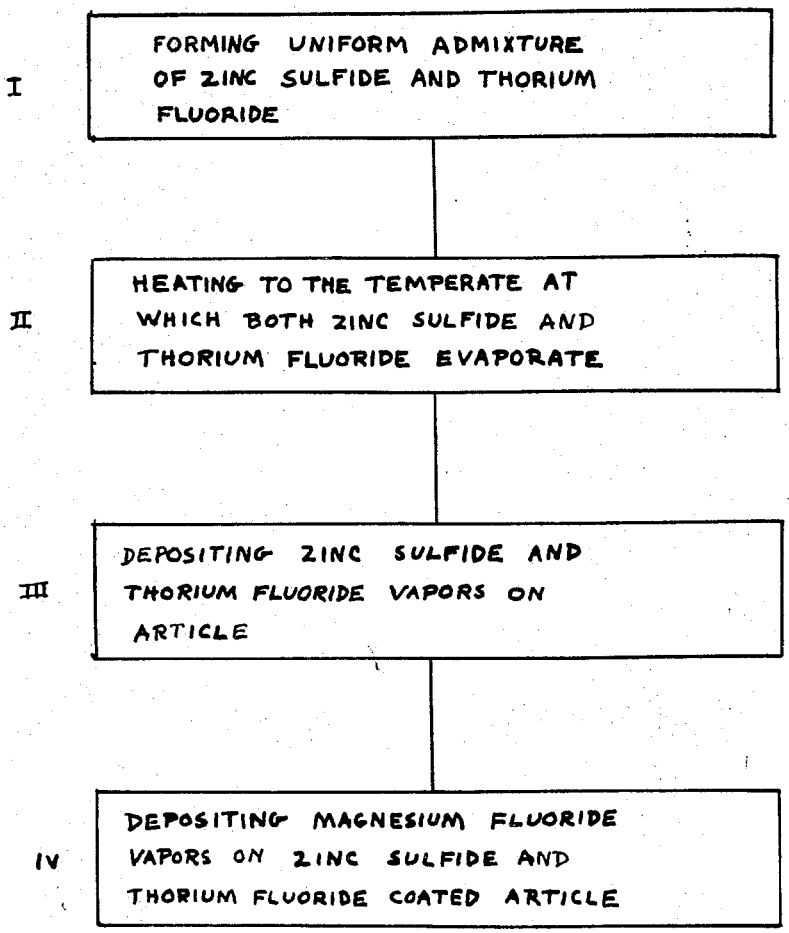

United States Patent Office 3,147,132
Patented Sept. 1, 1964

3,147,132
METHOD OF PREPARING A MULTI-LAYER REFLECTION REDUCING COATING
Walter Geffcken, Mainz, Germany, assignor to Jenaer Glaswerk Schott & Gen., Mainz, Germany, a German corporation
Filed Jan. 16, 1961, Ser. No. 82,904
Claims priority, application Germany Feb. 5, 1960
6 Claims. (Cl. 117—33.3)

The present invention relates to a method of producing layers consisting of different substances, especially for protective, electrical, optical, and similar purposes.

For producing, for example, very efficient anti-reflective layers, substances are frequently required which have a medium refractive index of about 1.79. Although in the art of high-vacuum vaporization a number of highly refractive substances are known which may be easily vaporized, for example, ZnS, $As_2S_3$, or $CeO_2$, and also low-refractive substances, mostly fluorides, for example, $MgF_2$, $ThF_2$, LiF, or cryolite, there has so far been a lack of easily accessible substances of a medium refractive index. Thus, for example, BeO requires very high volatilization temperatures.

According to the present invention, it has now been found that it is possible to produce mixed layers of an unexpected hardness if at least two substances, at least one of which cannot be mixed at the vaporizing temperature with the other substance or substances, are uniformly mixed with each other, are solidified to form a cohesive mass, and are vaporized together in a high vacuum.

The present invention further provides that the mentioned mass is solidified by compression, preferably in a vacuum, or by melting one component thereof. Such a solidification has the advantage that the volatile component of the mass will be prevented from escaping prematurely.

According to the invention, it is possible, for example, to produce layers which have a medium refractive index by simultaneously vaporizing in the same receptacle a mixture of ZnS with a difficultly soluble fluoride which is compressed into the form of a tablet. Even though the mixing ratio might vary within wide limits, it has been unexpectedly found that no fractionation occurs, which means that the layers have a very homogeneous refractive index which is very important for the practical application because it permits the amounts of the components required for the layers to be very accurately determined. Especially good results may be attained if one component consists of mixtures with $ThF_4$. The mentioned fact that no fractionation occurs is probably due to the fact that the fluoride, when melting, surrounds the infusible grains of the sulphide so that the latter can evaporate only if in the course of vaporization of the fluoride it passes to the surface.

In order to prevent the tablets from being broken up by inclusions of gases or moisture remaining therein when the tablets are being formed by compression, it is advisable to carry out the compressing operation under a vacuum. The apparatus required for this purpose are already obtainable in commerce. If required, these apparatus may also be operated at higher temperatures so that even the last traces of moisture which might lead to a decomposition of the tablets may be removed. The mixed layers which are produced in this manner are usually surprisingly hard. Thus, for example, a mixed layer which is composed of ZnS and $ThF_4$ is considerably harder than the pure ZnS and at least as hard as the $ThF_4$. The chemical resistance of such a layer against acids is very high.

The layers have therefore also proved very successful when used as protective layers.

The method according to the invention is not limited to two components. Thus, for example, coloring substances, for example, metals, substances which facilitate a condensation, fillers, and similar substances may be added.

The vaporization may be carried out in any suitable kiln, oven, or other heatable receptacle. Since, when the method is being carried out, a cushion of the gas mixture which is being evaporated usually forms underneath the tablet so that the tablet floats thereon, it may also be advisable to cover up the tablet by means of a screen or a perforated cover in order to prevent it or particles thereof from jumping out of the receptacle in which the vaporization is carried out.

If one component of the mixture might melt during the vaporization, the proportion of the components must be chosen so that the precipitation of a solid component will not result in the formation of a layer of the pure liquid component on the surface. Its volume is therefore limited in the upward direction. If the filling factor of the solid substance is called $f$, so that $1-f$ is the interspace factor, the upper limit for the liquid component must evidently be determined by the volume ratio $$q = \frac{1-f}{f}$$

of the two components. The weight ratio $p$ of $$\frac{S\ \text{liq.}}{S\ \text{sol.}} \cdot q \text{ equals } \frac{1-f}{f} \cdot \frac{S\ \text{liq.}}{S\ \text{sol.}}$$

in which S liq. means the medium density of the liquid component and S sol. means the medium density of the solid component.

It is known from experience that the upper limit of the weight ratio of $ThF_4$ to ZnS of a mixture of these materials amounts to approximately 1. However, even this ratio already results in a refractory index of less than 1.6 so that practically the entire range of refraction between pure ZnS ($n \approx 2.4$) and the fluoride is easily attainable.

Figure 2:
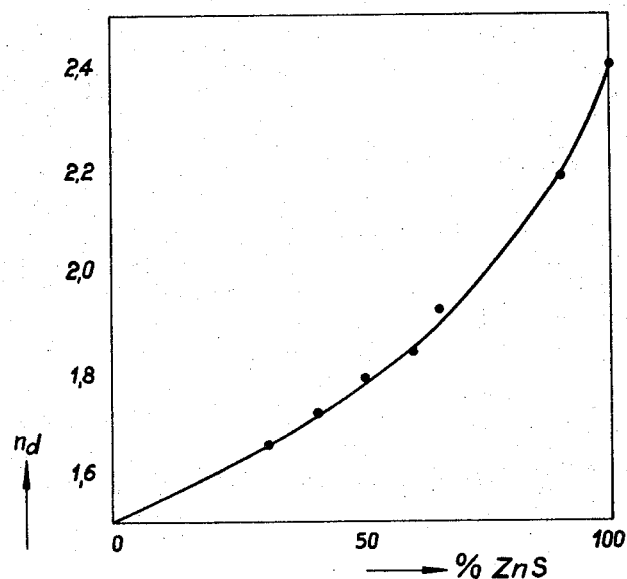

In the accompanying drawing FIG. 1 illustrates the process of forming, evaporating and depositing a uniform admixture of zinc sulfide and thorium fluoride and an article, and then depositing magnesium fluoride vapors upon the coated article. FIG. 2 the dependency of the refractive index of a mixed layer with a mixing ratio of ZnS to $ThF_4$. The abscissa indicates the content in ZnS in percent by weight, while the ordinate indicates the refractive indexes which may be easily determined from the measured reflection R of a layer of a thickness of $\lambda/4$ which is vaporized upon black glass in accordance with the formula $$R = \left(\frac{n_{\text{layer}} - n_{\text{glass}}}{n_{\text{layer}} + n_{\text{glass}}}\right)^2$$

It will be seen from the drawing that a smooth curve will be formed and that the measured points stray only slightly therefrom.

The method according to the invention may be carried out, for example, in the following manner:

Example 1

60 g. of melted anhydrous thorium fluoride are pulverized and thoroughly mixed in a mortar with 40 g. of zinc sulphide which has been tempered at 1200° C. for one hour under exclusion of oxygen, and the mixture is then compressed without any binder under a pressure of approximately 30 t./cm.² (tons per sq. cm.) into the form of pills which are then placed into a vaporizing receptacle. The vaporization is carried out at approximately the same temperature as the vaporization temperature of zinc sulphide, that is, at approximately 1000° C. Even though the velocity of vaporization might be very high, no overheating phenomena were observed which, due to a decomposition of ZnS, might result in discolored coatings and which frequently occur with pure ZnS. The layer thus attained has a refractive index $n_d$ of 1.70. If this layer is applied at an optical thickness of $\lambda/4$ upon a glass surface with a refractive index of 1.51, and if this layer is then coated with a layer of $MgF_2$ of a thickness of $\frac{1}{4}\lambda$, double layers with the highest possible reduction in reflection for the wave length $\lambda$ will be attained.

*Example 2*

A mixture of 62 g. of $ThF_4$ and of 38 g. of ZnS is prepared in the same manner as stated in the previous example, and a layer of this mixture of an optical thickness of only $0.24\lambda$, then a layer of ZnS of a thickness of $0.47\lambda$ and finally a layer of $MgF_2$ of a thickness of $0.25\lambda$ are vaporized upon each other. This results in a triple layer with the highest possible reduction in reflection within a large wave-length range around $\lambda$.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. The method of preparing a multi-layer coating at least one layer of which is an optically uniform thin layer consisting of at least two substances having different refractive indices, which comprises forming a uniform admixture of zinc sulfide and thorium fluoride, heating the admixture to the temperature at which both components evaporate, depositing the resulting vapors on a receiving surface to form thereon a coating layer of said evaporated mixture of an appropriate thickness, and thereafter applying on said first coating layer at least one further closely adherent layer of magnesium fluoride of a suitable thickness to produce a coating on said surface.

2. Method according to claim 1, wherein said admixture is formed into a pellet by compacting the components thereof.

3. Method according to claim 2, wherein said compacting is effected under vacuum.

4. Method according to claim 1, wherein the upper limit of the weight ratio of $ThF_4:ZnS$ is approximately 1.

5. The method of preparing a multi-layer coating at least one layer of which is an optically uniform thin layer consisting of at least two substances having different refractive indices, which comprises forming a uniform mixture of thorium fluoride and zinc sulfide, compacting said admixture into pellet form under vacuum, heating the pelletized admixture to a temperature at which both substances evaporate, depositing the resulting vapors on a receiving surface to form thereon a coating layer of a mixture of ZnS and $ThF_4$ of about $\lambda/4$, and thereafter applying on said coating layer a closely adherent layer of magnesium fluoride of the thickness of about $\frac{1}{4}\lambda$ by a vaporization thereof to produce a double layer coating.

6. The method of preparing a multi-layer coating at least one layer of which is an optically uniform thin layer consisting of at least two substances having different refractive indices, which comprises forming a mixture of thorium fluoride and zinc sulfide, compacting said admixture into pellet form under vacuum, heating the pelletized admixture to a temperature at which both substances evaporate, depositing the resulting vapors on a receiving surface to form thereon a coating layer of a mixture of thorium fluoride and zinc sulfide of a thickness of about $0.24\lambda$, superimposing over said first layer a closely adherent layer of zinc sulfide free of thorium fluoride of a thickness of about $0.47\lambda$ by vaporization, and superimposing over said second layer a closely adherent layer of magnesium fluoride of a thickness of $0.25\lambda$ by vaporization to produce a triple layer coating on said surface.

References Cited in the file of this patent

UNITED STATES PATENTS

| | | |
|---|---|---|
| 2,301,456 | Sabine | Nov. 10, 1942 |
| 2,397,929 | Dimmick | Apr. 9, 1946 |
| 2,435,435 | Fonda | Feb. 3, 1948 |
| 3,042,542 | Anders | July 3, 1962 |